United States Patent
Soreide et al.

(10) Patent No.: US 7,667,826 B2
(45) Date of Patent: Feb. 23, 2010

(54) SYSTEM AND METHOD FOR MOTION BASED VELOCITY DISCRIMINATION FOR DOPPLER VELOCIMETERS

(75) Inventors: David C. Soreide, Seattle, WA (US); Jonathan M. Saint Clair, Seattle, WA (US)

(73) Assignee: The Boeing Company, Chicago, IL (US)

(*) Notice: Subject to any disclaimer, the term of this patent is extended or adjusted under 35 U.S.C. 154(b) by 111 days.

(21) Appl. No.: 12/040,250

(22) Filed: Feb. 29, 2008

(65) Prior Publication Data

US 2009/0219507 A1    Sep. 3, 2009

(51) Int. Cl.
G01P 3/36    (2006.01)
(52) U.S. Cl. .................................. 356/28.5
(58) Field of Classification Search .......... 356/3.01–22, 356/28, 28.5
See application file for complete search history.

(56) References Cited

U.S. PATENT DOCUMENTS

| 5,502,558 | A  * | 3/1996  | Menders et al. ............ 356/28.5 |
| 7,299,013 | B2   | 11/2007 | Rotta |
| 2002/0105632 | A1 * | 8/2002 | Holton ...................... 356/28.5 |
| 2008/0024756 | A1   | 1/2008  | Rogers |
| 2009/0141997 | A1 * | 6/2009  | Lee et al. .................... 382/260 |

FOREIGN PATENT DOCUMENTS

JP    2004333165    11/2004

* cited by examiner

*Primary Examiner*—Thomas H Tarcza
*Assistant Examiner*—Luke D Ratcliffe
(74) *Attorney, Agent, or Firm*—Harness, Dickey & Pierce, P.L.C.

(57) ABSTRACT

A Doppler velocimeter apparatus and method of forming same. In one implementation a coherent light source is used for generating a beam of coherent light. An optical fiber receives the beam of coherent light. The optical fiber has an output face that is generally flat, thus enabling a first portion of the beam of coherent light to be reflected back on the optical fiber and to form a frequency offset, while a second portion of the beam of coherent light exits the optical fiber. A mechanism is used to move the output face of the optical fiber in an oscillating fashion so that the first portion of coherent light reflected back on the optical fiber produces an oscillating waveform that forms a frequency offset. An optical element receives the second portion of light from the face of the optical fiber and transmits it to a subject, and then receives a reflected optical signal back from the subject. The reflected optical signal, when mixed with the oscillating frequency offset, produces a Doppler shift that is dependent on the motion of the subject. A processing subsystem processes the mixed signal and determines the Doppler shift of the reflected signal.

20 Claims, 3 Drawing Sheets

SYSTEM AND METHOD FOR MOTION BASED VELOCITY DISCRIMINATION FOR DOPPLER VELOCIMETERS

FIELD

The present disclosure relates to velocimeters, and more particularly to a system and method for motion based velocity discrimination for Doppler velocimeters.

BACKGROUND

The statements in this section merely provide background information related to the present disclosure and may not constitute prior art.

Velocity measurements using a Laser Doppler technique do not inherently resolve the direction of the velocity. The current methods to determine the sign of the velocity tend to be complex, bulky and/or require significant electrical power. Additionally, previously developed systems and methods usually impose a secondary peak at zero velocity. This tends to create a dead band in velocity around zero velocity. For applications where the velocities are low, the dead band in velocity around zero velocity is a significant performance limitation of such systems.

There are generally two classes of direction resolution solutions. The first class measures both the signal and quadrature of the electrical beat frequency. A Fourier transform of a time series including both signal and quadrature is generated that has both positive and negative frequencies. The second class of solutions imposes a fixed, offset frequency on a local oscillator of the system. The difference between a detected beat frequency and the fixed offset frequency can be both positive and negative, thus resolving the direction ambiguity. Two common methods are used for imposing a frequency offset. An Acousto-Optic Modulator can be used to impose an offset frequency in the range of about 30-250 MHz. A rotating radial grating can be used to impose lower frequency offsets.

The first class of solutions described above (i.e., measuring both signal and quadrature) also requires a complex optical subsystem which cannot be implemented in an optical fiber. With the second solution mentioned above, an acoustic optic-modulator is required. An acoustic optic-modulator is a relatively large and heavy component and typically requires several watts of radio frequency (RF) power to operate. It is also somewhat electrically noisy. The use of a rotating radial grating also has limitations associated with it. For one, this component requires a precision motor to rotate the grating at a fixed frequency. Without extreme care, the rotating grating is susceptible to vibration. Moreover, the use of a rotating radial grating is not easily adapted to an optical fiber system.

SUMMARY

The present disclosure is directed to a Doppler velocimeter apparatus and method of forming same. In one aspect the apparatus comprises a coherent light source for generating a beam of coherent light. An optical fiber is used for receiving the beam of coherent light. The optical fiber has an output face that is generally flat, thus enabling a first portion of the beam of coherent light to be reflected back into the optical fiber, while a second portion of the beam of coherent light exits the optical fiber. A mechanism is used for moving the output face of the optical fiber in an oscillating fashion, such that the light frequency of the first portion of coherent light reflected back into the optical fiber is modulated. An optical element receives the second portion of light from the face of the optical fiber and transmits it to a subject, and receives a reflected optical signal back at the optical element. The reflected light has a frequency that is dependent on the motion of the subject. A photodetector mixes these two beams. A processing subsystem receives the mixed RF signal and determines therefrom the Doppler shift of the reflected light from the subject, as well as the direction of velocity of the subject.

In another aspect a method for forming a Doppler velocimeter is disclosed. The method may comprise initially generating a beam of coherent light. The beam of coherent light is directed through an optical fiber, the optical fiber having an output face that is generally flat. This enables a first portion of the beam of coherent light to be reflected back into the optical fiber, while a second portion of the beam of coherent light exits the optical fiber. The first portion of the beam forms a local oscillator. The output face of the optical fiber is moved in an oscillating fashion such that the first portion of coherent light reflected back on the optical fiber has a modulated frequency offset. An optical element is used to transmit the second portion of light to a subject, and to receive a reflected optical signal back from the subject. The first portion of the beam and the reflected optical signal are then mixed. Finally, the mixed signal is processed to determine a Doppler shift for the reflected optical signal, as well as the direction of the velocity.

In another aspect of the present disclosure a method is disclosed for optically detecting a frequency of an oscillating surface. The method may comprise directing a beam of coherent light through an optical fiber, the optical fiber having an output face that is configured to reflect a first portion of the beam of coherent light back on the optical fiber, while a second portion of the beam of coherent light exits the optical fiber. The first portion forms a local oscillator. The output face of the optical fiber is moved in an oscillating fashion along a longitudinal axis of the optical fiber such that the first portion of coherent light reflected back on the optical fiber produces a waveform that forms a frequency offset. The second portion of light is transmitted to a surface. A reflected optical signal of scattered light is received back from the surface. The first portion of the beam and the reflected optical signal are mixed to form a mixed signal. The mixed signal is processed to determine a Doppler shift for the reflected optical signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
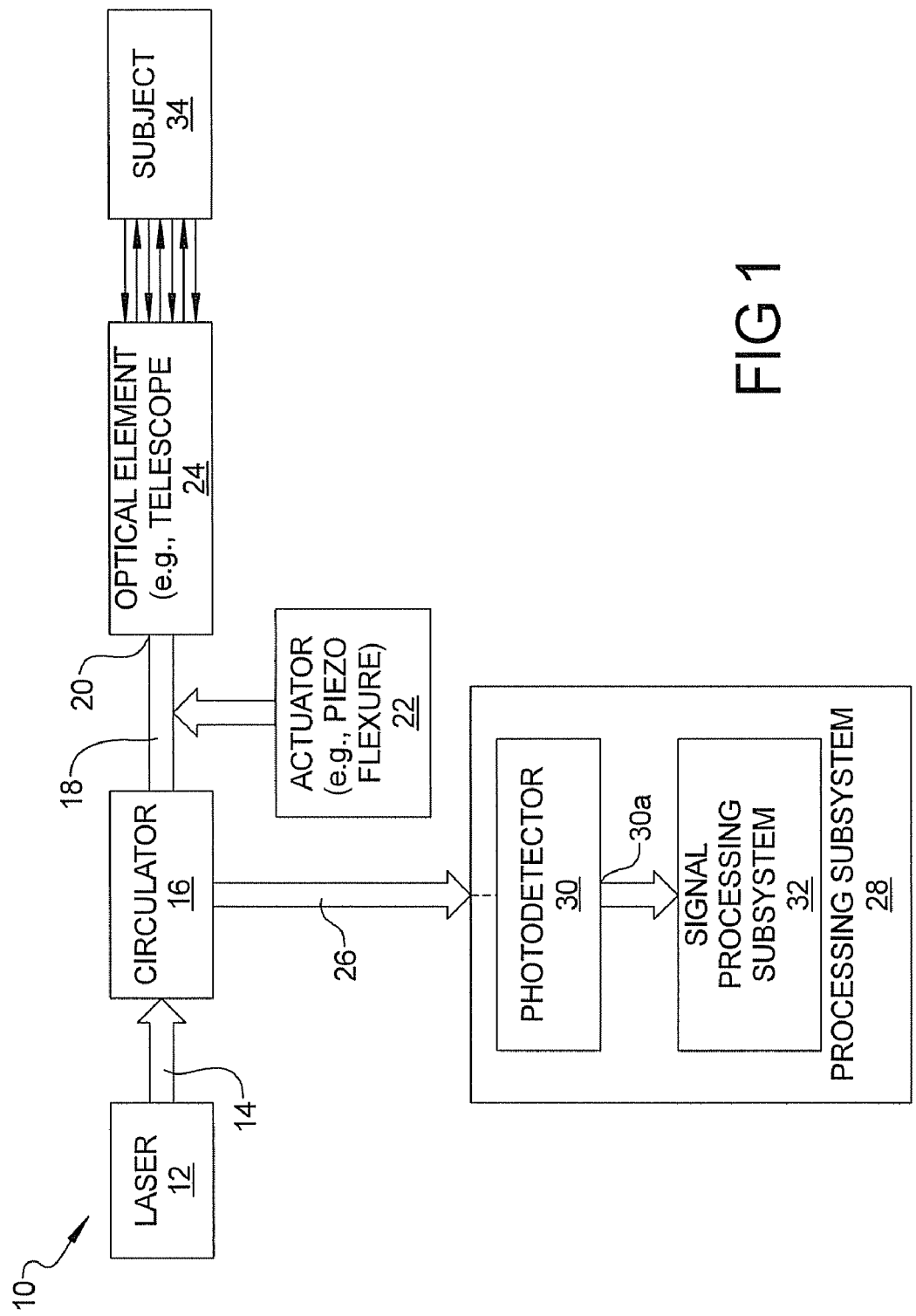
FIG. 1 is a high level block diagram of a system in accordance with the present disclosure.

Referring to FIG. 1, there is shown a Doppler velocimeter apparatus 10 in accordance with one embodiment of the present disclosure. The apparatus 10 includes a component for generating coherent light, in this embodiment a laser 12. The laser 12 projects a beam of coherent light into a first fiber optic 14 which travels through a circulator 16. The circulator 16 passes the beam of coherent light through a second fiber optic 18 to an output face 20 that has been polished generally flat. The output face 20 is physically supported by an actuator 22 that moves the output face 20 in an oscillating motion along the longitudinal axis of the second fiber optic 18 (i.e., back and forth in a horizontal motion in the drawing of FIG. 1). The beam of coherent light is projected by an optical element 24, in this example a telescope. The circulator 16 includes a port that is coupled to a third fiber optic 26. The third fiber optic 26 is coupled to a processing subsystem 28 having a photodetector 30 and a signal processing subsystem 32.

The flat output face 20 of the second fiber optic 18 operates to reflect a first portion of the coherent light beam (typically about 4%) back through the circulator 16. The circulator 16 is a commercially available component available from a number of sources, for example AC-Photonics, Inc. of (Santa Clara, Calif., PMOC-1550-A-2-1-1. The circulator 16 essentially acts as a multi-way valve to selectively direct optical signals between the laser 12 and the telescope 24, as well as to direct optical signals travelling in the opposite direction on the second fiber optic 18 to the processing subsystem 28. The photodetector 30 is also a commercially available component that may be obtained from a number of sources, for example from the New Focus Corp. of Los Angeles, Calif. The signal processing subsystem 32 may comprise a computer such as a personal computer or even a lap top computer.

The telescope 24 is used to both project the coherent beam of light exiting therefrom, as well as to receive scattered light that reflects off of a subject that 34 is being monitored with the apparatus 10. The actuator 22 that moves the output face 20 of the second fiber optic 18 may comprise a tuning fork, an electrically excited piezoelectric element (i.e., piezoelectric flexure), or any other structure that can impart a low amplitude (typically between about 30 microns-100 microns) oscillating motion of between about 100 Hz-10 KHz to the output face 20. As mentioned herein, the output face 20 is preferably polished generally flat, which causes a small amount of the coherent light to be reflected back into the second fiber optic 18. Thus, by moving the output face 20 in an oscillating fashion, this causes the output face 20 to physically act as a "local oscillator" to generate an oscillating optical reference signal that serves as a frequency offset (i.e., a baseline signal) when performing Doppler measurement/analysis.

Figure 2:
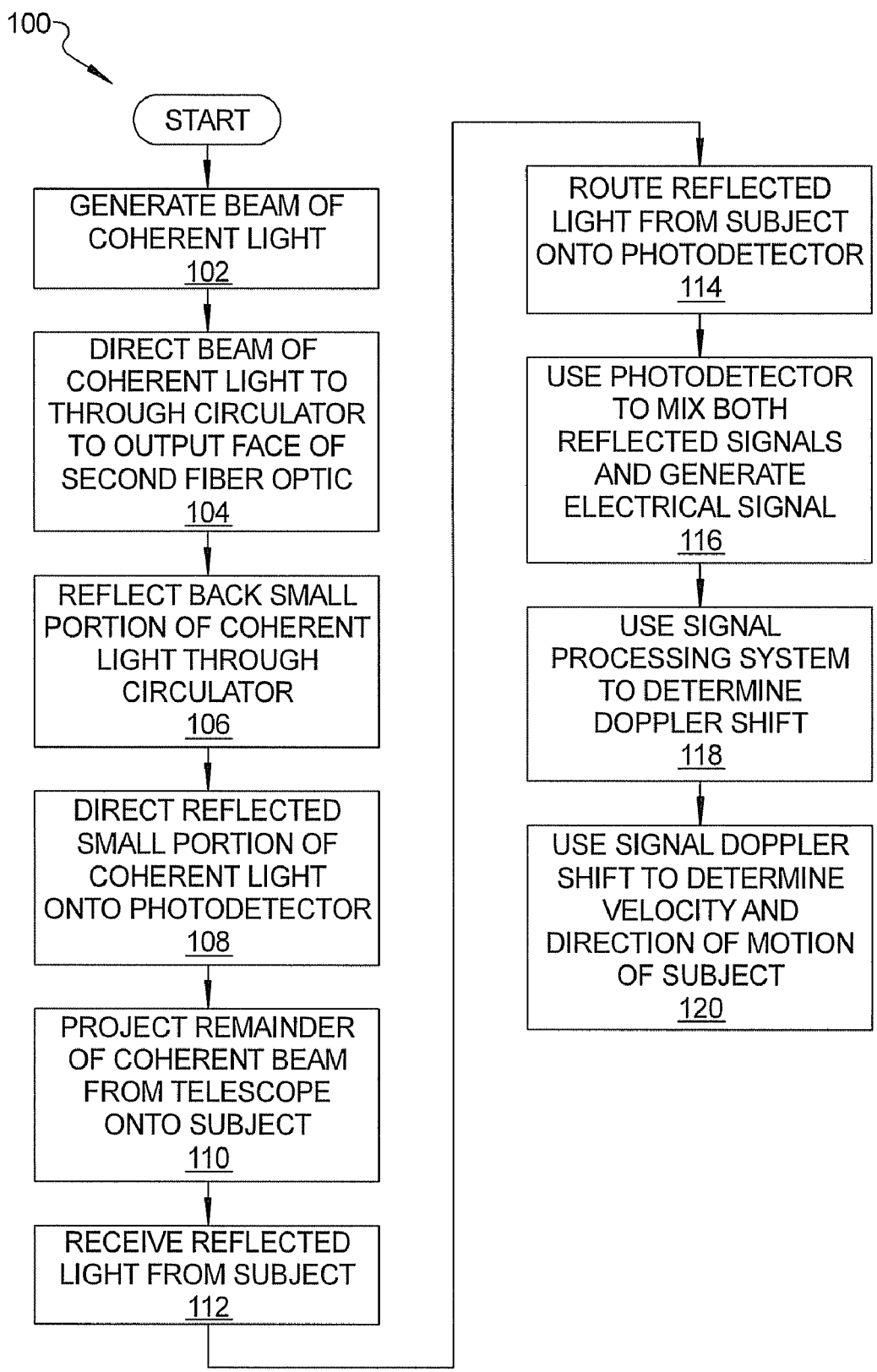
FIG. 2 is a flowchart of major operations performed in accordance with one implementation of a method of the present disclosure.

Referring to FIG. 1 and the flowchart 100 of FIG. 2, the operation of the apparatus 10 will now be described. In operation, the laser 12 generates a beam of coherent light that passes through the first fiber optic 14 to the circulator 16, as indicated at operation 102. The beam of coherent light passes unimpeded through the circulator 16 and then through the second fiber optic 18 to its flat output face 20, as indicated at operation 104. A small portion of the coherent beam of light (i.e., the first portion of the coherent light) is reflected back by the flat output face 20 through the second fiber optic 18 and through the circulator 16, as indicated at operation 106. At operation 108 the reflected portion (i.e., first portion) of coherent light passes through the third fiber optic 26 onto the photo detector 30. At operation 110 the remaining beam of coherent light is projected by the telescope 24 onto the subject (or object) 34. At operation 112 the scattered light reflecting off of the subject 34, which forms the reflected optical signal, is received by the telescope and fed back in to the second fiber optic 18 through the output face 20. At operation 114 the second fiber optic 18 routes the reflected optical signal through the circulator 16, into the third fiber optic 26, and on to the photodetector 30. At operation 116 the photodetector 30 mixes the first portion of the coherent beam and the reflected optical signal incident thereon and generates an oscillating electrical signal at its output 30a. At operation 118 the oscillating electrical signal is fed into the signal processing subsystem 32 which analyzes the signal to determine the Doppler shift in frequency from the frequency offset produced by the oscillating output face 20. As indicated at operation 120, the Doppler shift is then used to determine the velocity and motion of the surface of the subject 34. The signal processing subsystem 32 thus measures the beat frequency of the motion of the subject 34.

In determining the direction of motion of the subject, it will be appreciated that if the surface of the subject 34 is stationary, then the signal processing subsystem 32 will be measuring two fixed frequencies, one when the physical motion is toward the object being measured and a second when the motion is away from the object. Some signal regions are generally discarded since the imposed frequency is changing too fast. No additional oscillating optical signal will be generated.

As the surface of the subject 34 moves, the oscillating electrical signal output from the photodetector 30 will have either a frequency larger than the offset frequency discussed above or a frequency smaller than the offset. A difference frequency can be calculated as the measured frequency minus the offset frequency. This quantity will have opposite signs, depending on the direction of movement of the output face 20 of the second fiber optic 18. For example, if the output face 20 is moving to the left in FIG. 1, while the surface of the subject 34 is moving to the right, then the difference frequency of the electrical signal at the photodetector 30 output 30a will be decreasing. In this instance the sign of the mixed optical signal from the photodetector will be negative. Conversely, if the output face 20 is moving to the right in FIG. 1, while the surface of the subject 34 is moving to the left, then the frequency of the electrical signal at the photodetector 30 output 30a will be increasing. In this instance the sign of the difference will be positive. Processing the oscillating electrical signal output from the photodetector 30) may likely require that the signal processing subsystem 32 process the positive and negative signal components separately.

Figure 3:
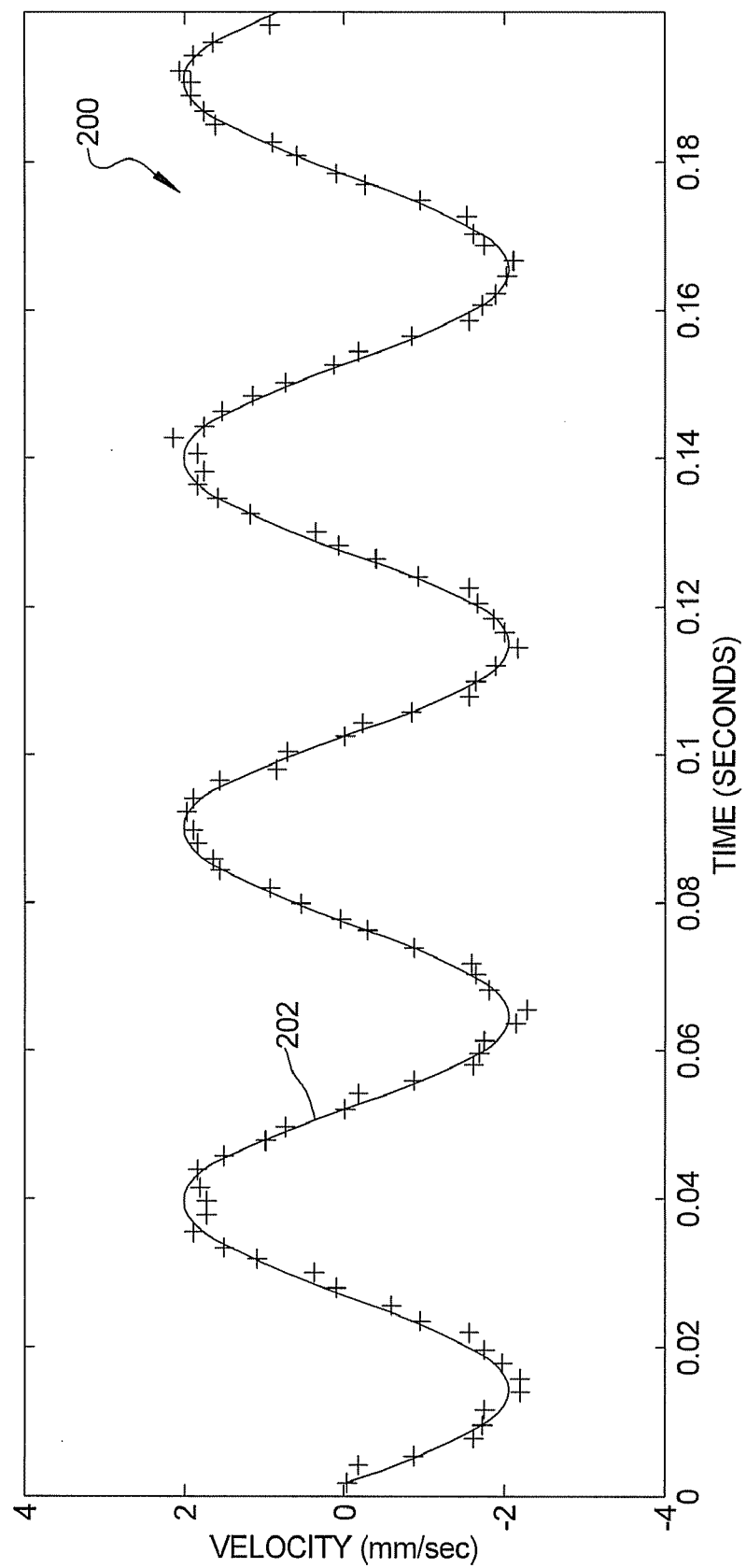
FIG. 3 is a graph showing a test result wherein the Doppler velocimeter of the present disclosure was used to detect the motion of a test subject, and illustrating the high degree of accuracy with which the velocity of motion of the test subject, as well as its direction of motion, can be detected.

FIG. 3 illustrates a graph 200 showing test results for the apparatus 10. The solid sinusoidal waveform 202 was produced using a piezo-electric flexure stage (as the actuator 22) capable of moving the output face 20 of the fiber second optic 18 about 15 microns. With a 1.0 inch (25.4 mm) telescope, this did not significantly defocus the telescope 24. The piezo-flexure stage was driven in accordance with a 250 Hz sinusoidal signal. The surface being monitored was moved using a galvanometric motor at a 20 Hz frequency with an amplitude of 16 microns. The measured data points are denoted with "+" symbols. The difference between the data and the waveform 202 is approximately 200 microns per second. However, some of this difference is due to noise in the galvanometric motor that was used. The noise on a fixed surface is typically around 20 microns per second. Note in particular that measurements are readily obtained at both the peak velocity points and at those areas of the waveform 202 where the velocity is zero.

The apparatus 10 described herein can be used in a wide variety of velocity detection/monitoring applications. For example, the apparatus 10 can be used in optically detecting very slight (i.e., low amplitude) oscillating motion, such as for detecting a pulse in the wrist or neck area of an individual. As such, the apparatus 10 is expected to find significant utility in medical applications where respiration or other vital signs of a patient need to be monitored.

The apparatus 10 thus provides a significant advantage in that the frequency offset is generated by moving the output end 20 of the second fiber optic 18. Previously developed systems require a more complex system that is capable of either measuring the quadrature of the electrical signal, or alternatively of imposing a frequency offset on a local oscillator using complex acousto-optic modulators or by rotating a radial grating that the coherent light beam passes through. Such subsystems are not required with the present apparatus 10. The present apparatus 10 is thus significantly less complex and less costly to implement. In fiber optic systems the apparatus 10 eliminates the frequency peak at zero velocity of the subject, and also eliminates the usual "dead band" that occurs around zero velocity. Overall, the components required to construct the apparatus 10 are fewer and less costly than those required to construct previously developed Doppler velocimeters.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A Doppler velocimeter apparatus, comprising:
   a coherent light source for generating a beam of coherent light;
   an optical fiber for receiving the beam of coherent light, the optical fiber having an output face that is generally flat, thus enabling a first portion of the beam of coherent light to be reflected back on the optical fiber and to form a frequency offset, while a second portion of the beam of coherent light exits the optical fiber;
   a mechanism that moves the output face of the optical fiber in an oscillating fashion, such that the first portion of coherent light reflected back on the optical fiber produces a waveform that forms a frequency offset;
   an optical element that receives the second portion of light from the face of the optical fiber and transmits it to a subject, and receives a reflected optical signal back at the optical element, the reflected optical signal having a frequency dependent on the motion of the subject; and
   a processing subsystem for mixing said first portion of the beam of coherent light and said reflected optical signal, and determining therefrom a Doppler shift of said reflected optical signal.

2. The apparatus of claim 1, wherein said coherent light source comprises a laser beam.

3. The apparatus of claim 1, further comprising a circulator disposed in said optical fiber between an output side of said coherent light source and said output face, the circulator adapted to pass coherent light therethrough travelling from said coherent light source to said output face, while enabling said first portion of the beam and said reflected optical signal to pass through to said processing subsystem.

4. The apparatus of claim 1, wherein said processing subsystem comprises:
   a photo detector for receiving and mixing said first portion of said beam and said reflected optical signal, and generating an electrical output signal in accordance therewith; and
   a signal processing subsystem for receiving said electrical output signal at an input thereof and generating an output signal indicative of said Doppler shift.

5. The apparatus of claim 1, wherein said mechanism comprises a piezoelectric actuator.

6. The apparatus of clam 1, wherein said mechanism moves said face of said optical fiber in an oscillating motion over a distance of about 15 microns.

7. The apparatus of claim 3, wherein said circulator and said processing subsystem are coupled by an additional length of optical fiber.

8. A method for forming a Doppler velocimeter, the method comprising:
   generating a beam of coherent light;
   directing said beam of coherent light through an optical fiber, the optical fiber having an output face that is generally flat, thus enabling a first portion of the beam of coherent light to be reflected back on the optical fiber, while a second portion of the beam of coherent light exits the optical fiber, the first portion forming a local oscillator;
   moving the output face of the optical fiber in an oscillating fashion, such that the first portion of coherent light reflected back on the optical fiber produces a waveform that forms a frequency offset;
   using an optical element to transmit the second portion of light to a subject, and to receive a reflected optical signal back from the subject;
   mixing the first portion of the beam and the reflected optical signal to form a mixed signal; and
   using the mixed signal to determine a Doppler shift for the reflected optical signal.

9. The method of claim 8, wherein said directing a beam of coherent light comprises directing a beam of light from a laser.

10. The method of claim 8, wherein said moving the output face of the optical fiber comprises moving the output face linearly along in an oscillating fashion along an axis of the beam of coherent light.

11. The method of claim 10, wherein said moving the output face of the optical fiber comprises moving the output face in an oscillating fashion at a frequency of between about 100 Hz to about 10 KHz.

12. The method of claim 8, wherein said using an optical element comprises using a telescope.

13. The method of claim 8, wherein said mixing the first portion of the beam and the reflected optical signal comprises using a photodetector to mix the reflected optical signal and the first portion of the coherent beam of light.

14. The method of claim 8, wherein said using the mixed signal to determine a Doppler shift comprises using a computer.

15. A method for optically detecting a frequency of an oscillating surface, comprising:
   directing a beam of coherent light through an optical fiber, the optical fiber having an output face that is configured to reflect a first portion of the beam of coherent light back on the optical fiber, while a second portion of the beam of coherent light exits the optical fiber, the first portion forming a local oscillator;

moving the output face of the optical fiber in an oscillating fashion along a longitudinal axis of the optical fiber, such that the first portion of coherent light reflected back on the optical fiber produces a waveform that forms a frequency offset;

transmitting the second portion of light to a surface;

receiving a reflected optical signal of scattered light back from the surface;

mixing the first portion of the beam and the reflected optical signal to form a mixed signal; and processing the mixed signal to determine a Doppler shift for the reflected optical signal.

16. The method of claim 15, wherein said directing a beam of coherent light comprises using a laser.

17. The method of claim 15, wherein said transmitting the second portion of light to a surface comprises using a telescope to focus the second portion of light and to transmit the second portion of light to the surface.

18. The method of claim 15, wherein said mixing the first portion of the beam comprises using a photodetector to receive the first portion of the beam and said reflected optical signal, and to generate therefrom an oscillating electrical signal.

19. The method of claim 18, wherein said processing the mixed signal comprises using a computer to process said oscillating electrical signal, and to determine therefrom said Doppler shift of said reflected optical signal.

20. The method of claim 15, wherein said output face of said optical fiber is moved at a frequency of between about 100 Hz-10 KHz.

* * * * *